United States Patent

Okuwaki et al.

(10) Patent No.: US 7,072,116 B2
(45) Date of Patent: Jul. 4, 2006

(54) SHEET LIGHT EMITTING APPARATUS

(75) Inventors: Daisaku Okuwaki, Fujiyoshida (JP);
Takashi Shimura, Fujiyoshida (JP);
Kiyokazu Watanabe,
Fujikawaguchiko-machi (JP); Junji Miyashita, Fujiyoshida (JP)

(73) Assignee: Citizen Electronics Co., LTD, Yamanashi (JP)

( * ) Notice: Subject to any disclaimer, the term of this patent is extended or adjusted under 35 U.S.C. 154(b) by 91 days.

(21) Appl. No.: 10/828,552

(22) Filed: Apr. 21, 2004

(65) Prior Publication Data

US 2004/0246601 A1 Dec. 9, 2004

(30) Foreign Application Priority Data

Apr. 21, 2003 (JP) ............... P2003-116384

(51) Int. Cl.
*G02B 5/02* (2006.01)
(52) U.S. Cl. ............... 359/599; 362/620
(58) Field of Classification Search ............... 359/834, 359/599; 362/620, 621, 622; 349/57, 61
See application file for complete search history.

(56) References Cited

U.S. PATENT DOCUMENTS

| 5,709,447 A | * | 1/1998 | Murakami et al. ........... 362/621 |
| 5,887,964 A | * | 3/1999 | Higuchi et al. ............. 362/620 |
| 5,926,033 A | * | 7/1999 | Saigo et al. ................ 362/600 |

FOREIGN PATENT DOCUMENTS

| JP | 06-51130 | * | 2/1994 |
| JP | 10-199316 | * | 7/1998 |
| JP | 2002-082625 | | 3/2002 |
| JP | 2002-196151 | | 7/2002 |

* cited by examiner

Primary Examiner—Alessandro Amari
(74) Attorney, Agent, or Firm—Browdy and Neimark, PLLC

(57) ABSTRACT

A sheet light emitting apparatus, including a light guiding plate of a translucent material and having light receiving and light emitting surfaces, a light source disposed to face the light receiving surface, and a prism structure provided on the light receiving surface, the prism structure having plural kinds of prisms having different apex angles.

9 Claims, 28 Drawing Sheets

Brightness
— AAsectoin
— BBsection

SHEET LIGHT EMITTING APPARATUS

BACKGROUND OF THE INVENTION

1. Field of the Invention

The present invention relates to a sheet light emitting apparatus configured to introduce light from a light source into a light guiding plate, emit the light through the light guiding plate and to illuminate all of a surface of an object to be illuminated such as a liquid crystal cell in a liquid crystal display, by the exit light from the light guiding plate.

2. Description of Related Art

A thinned liquid crystal display is used recently, as a display of a book type word processor, a computer, a mobile phone or other mobile terminal devices. A sheet light emitting apparatus having a light guiding plate is used in order to illuminate such a thinned liquid crystal display. A line shaped light source such as a fluorescent tube and a point-shaped light source comprising a plurality of light emitting diodes (hereinafter, referred to as LEDs) or the like are used, as a light source of the sheet light emitting apparatus. The LEDs have a low applied voltage and lower power consumption and therefore are used as a light source in a small liquid crystal display or the like.

Recently, more bright illumination has been requested to the light source, because of evolution of colorization in the small liquid crystal display, and multi brightness of a conventional liquid crystal display in black and white has been desired. Therefore, light having a high directivity, which is emitted from the LEDs as the light source is used and it has been required to take the light into a light guiding plate having a more high density. Accordingly, in the sheet light emitting apparatus using the plurality of LEDs as the light source, LEDs having a high directivity of emitted light are used. However, when the LEDs having the high directivity of the emitted light are used, there is a defect that a valley of light for propagating within a light guiding plate 31 is generated in a side (side of an end surface 31a) of the light guiding plate 31 close to the LEDs 32, for example, as sown in Japanese Patent Laid-Open No. 2002-082625 (FIG. 4) and therefore there is generated a triangle A to which light does not arrive between the LEDs and both ends of the LEDs.

FIGS. 13A to 13C illustrate one example of a conventional sheet light emitting apparatus. In FIGS. 13A to 13C, reference numeral 102 denotes LEDs constituting a light source for emitting light, 101 a light guiding plate, 103 a prism sheet disposed to face an upper surface 101a of the light guiding plate 101, 104 a reflective sheet disposed adjacently to face a lower surface 101b of the light guiding plate 101.

As shown in FIG. 13A, the light guiding plate 101 is a rectangular in a planar shape and is made of a translucent material of a plastic material or the like. The lower surface 101b of the light guiding plate is formed into a scattering surface of light of uneven concave and convex surfaces by crimps, dots, prisms or printing.

A plurality of LEDs 102 are disposed to face a light receiving surface 101c which is one side surface of the light guiding plate 101. Four surfaces of the light guiding plate 101, including the upper and light receiving 101a and 101c are formed into smooth surfaces of mirror surfaces or the like.

When applying a predetermined current to the LEDs 102 to light them, light emitted from the LEDs 102 enters passing through the light receiving surface 102c by refracting into the light guiding plate 101 and becomes inner light which widens within the light guiding plate. The inner light, while repeating diffused reflection on the lower surface 101b of the light guiding plate 101 and total reflection on the upper surface 101a thereof, propagates within the light guiding plate 101, and transmits the upper Surface 101a by refracting during the propagation, and exits toward above. The exited light enters into the prism sheet 103, a direction is arranged substantially perpendicularly on the drawing by refracting operation of the prism sheet to become planer illumination light, and the planar illumination light is emitted from the prism sheet toward an illuminated object (not shown) such as a liquid crystal panel.

In addition, the reflective sheet 104 operates to reflect light emitted outwardly by scattering of light on the lower surface 101b of the light guiding plate 101, to return in the light guiding plate 1 again, and to improve the usability of light.

Here, an area S shown at diagonal lines in FIG. 13A is a light present area in which the inner light entering from the LEDs 102 passing through the light receiving surface 101c with refraction into the light guiding plate 101 is existing and distributed within the light guiding plate 101. An area S1, which has no diagonal lines is a light absent area in which the inner light is not existing. The light absent area S1 that the inner light is not existing forms a triangle having a hypotenuse which corresponds to refracting light of the maximum refracting angle. As shown in FIG. 18C, for example, when the maximum exit angle of light s emitted from the LEDs 102 is 55°, the maximum refracting angle or the maximum exit angle of the refraction in the light receiving surface 101c in which the light s enters becomes about 30° and an angle formed between the hypotenuse and a bottom of the triangle of the light absent area S1 is about 60°.

In this way, the light absent area S1 that the inner light does not exist in the light guiding plate 101 exists in a state entering considerably from the light receiving source 101c. Accordingly, in the sheet light emitting apparatus using the light guiding plate 101, there are a bright part and a dark part alternately in the portion near the LEDs 102 or portion near the light receiving surface 101c, when illuminating the illuminated object such as a liquid crystal cell, the brightness is uneven and a good illumination is not required. The unevenness of brightness has a problem especially because the distribution of brightness in the light guiding plate reflects almost direct to the brightness of the illumination light in a structure in which the prism sheet 103 is disposed to face directly the light guiding plate without providing a diffusion plate between the light guiding plate and the prism sheet, because of a thinned type and a simplification for the sheet light emitting apparatus, as shown in FIGS. 13A to 13C.

To improve the problem, for example, as shown in Japanese Patent Laid-Open 2002-196151 (FIGS. 1 and 2), there is known a sheet light emitting apparatus in which a plurality of prisms are formed on a light receiving surface 1c of a light guiding plate 1 facing LEDs 2. According to this, because an incident angle of light from the LEDs into the prisms can be small, a less turning of light from the LEDs due to refraction when the light enters into the light guiding plate can be accomplished, an area of a dark part of illumination can be reduced and uneven brightness of illumination can be improved.

FIGS. 14A to 14C illustrate a conventional sheet light emitting apparatus having a light guiding plate provided with the prisms as described in FIGS. 14A to 14C, reference numeral 101p denotes a plurality of prisms provided on a light receiving surface 101c of the light guiding plate 101. The other structure is the same as that of the sheet light emitting apparatus as shown in FIG. 13A to C.

An apex angle α of each of the prisms 101p as shown in FIG. 14C is less than 60° in one example. At this time, the light s emitted at the maximum exit angle 55° from the LEDs 101 is entered at a side upper than a normal line to an oblique surface of each of the prisms 101p and turns outwardly by the refraction and as a result, the exit angle of transmitted light sp to the light receiving surface 101c is more than 55°. The exit angle is about 60° in the example as shown in the drawings.

If the apex angle of the each prism 101p is 70°, the incident angle of the light s to the prism becomes 0°, and the light goes directly without turning and the exit angle of the transmitted light sp is 55° while the refracted light in which the apex angle α is less than 70°, turns outwardly, and the exit angle of the transmitted light sp is more than 55°, if the apex angle α is less than 60°, the exit angle approaches 60°. In other words, the maximum exit angle standardizing the light receiving surface 102c of the transmitted light sp is about 60°, which is larger than the maximum exit angle, about 30°, in the absence of the prisms, as shown in FIG. 13C.

When the maximum exit angle is small, as shown in FIG. 13A, a gradient of an oblique plane of a triangle of a light absent area S1 is sharp and the entrance of light into the light guiding plate 102 at the light absent area S1 is deep.

On the contrary, when the maximum exit angle is large, as shown in FIG. 14A, the gradient of the oblique plane of the triangle of the light absent area S1 is gentle and the entrance of light into the light guiding plate 102 at the light absent area S1 is shallow. The entrance of light into the light absent area S1 becomes more shallow, the uniformity of brightness of light in the light guiding plate is increased.

Here, the maximum exit angle within the light guiding plate 101 is further large and the entrance of light into the light absent area S1 can be shallowed, as the apex angle of each prism becomes small and the inclined angle of the oblique plane of each prism becomes large. Consequently, it is possible to shallow the entrance of light into the light guiding plate 101 at the light absent area S1, to enhance the uniformity of brightness of inner light in the light guiding plate and to thus enhance the uniformity of brightness of illumination light, by selecting suitably the apex angles of the prisms as described above.

In addition, FIG. 15 illustrates collecting light fluxes in which the transmitted lights of the prisms are collected. In FIG. 15, reference sign SK denotes the collecting light fluxes in which a plurality of transmitted lights sp of the prisms 101p sown in FIG. 14C are collected every the LEDs 102. FIG. 16A illustrates a distribution of the collecting fluxes SK in the light guiding plate 101.

There is a problem in the sheet light emitting apparatus using the light guiding plate having the plurality of prisms as follows.

That is to say, as described above, lights emitted from the LEDs transmit the plurality of prisms 101p to form a plurality of transmitted lights sp, the transmitted lights sp are collected to form the collecting light fluxes SK and then the collecting light fluxes are emitted from each of the LEDs 102 as shown in FIG. 16A, separate rightward and leftward (upward and downward on the drawings into approximately mountain shapes and go and distribute in the light guiding plate 101. In the collecting light fluxes SK, when spaces (w in FIG. 15) between the transmitted lights of the prisms are narrow, the collecting light fluxes SK are recognized as one combined light to distinguish as a bright line.

Meanwhile, dark parts are easy to occur in periphery (gaps between the collecting light fluxes) of the collecting light fluxes SK.

That is to say, as shown in FIG. 15, if the maximum exit angles of the transmitted lights sp are large, and the minimum oblique angles of the prisms to the light receiving surface 101c are small, the space W between the adjacent transmitted lights with respect to the transmitted lights sp refracted by the plurality of prisms 101p is small, there are cases that the space can be discriminated by the naked eye and the plurality of light fluxes are seen together.

In such a case, as shown in FIG. 16A, each of the transmitted lights sp (see FIG. 15) of the prisms in the collecting light fluxes SK of the mountain shapes widening rightward and leftward (upward and downward on the drawing) starting from each of the LEDs 102, as a whole of the light guiding plate 101 cannot be discriminated, and therefore the collecting light fluxes SK are recognized as one light, whereby distinguishing as the bright line.

Next, despite whether the collecting light fluxes SK are recognized as one body, there are areas R of gaps between the collecting light fluxes SK as shown in FIG. 16A, the brightness of light tends to drop in each of the areas. According to this, the drop of brightness in each of the areas R of gaps is seen, while, in particular, a significant drop of the brightness in a B—B section is seen (see FIG. 16B).

In this way, in the conventional sheet light emitting apparatus having the light guiding plate provided with the prisms, the entrance of light into the light guiding plate 101 at the light absent area S1 is shallow by means of each the prisms 101p, there is an advantageous effect in this point but there is a case that the bright line of the collecting light fluxes as described above is distinguishing in the light guiding plate 101 and there is a problem that the formality of brightness is reduced within the light guiding plate.

Meanwhile, in the sheet light emitting apparatus having no diffusion plate as shown in FIGS. 14A to 14C, because the distribution of brightness of the inner light in the light guiding plate and the generation of the bright line are reflected directly on the quality of illumination light, there is generated a large problem in particular. In other words, in the sheet light emitting apparatus as shown in FIG. 17, which is a reference drawing, a diffusion sheet 105 is disposed to face a light guiding plate 101 and prism sheets 103 are disposed above the diffusion sheet 105. In this case, a bright line of inner light and a distribution of brightness in the light guiding plate 101 are smoothed to a degree and reflected on illumination light.

However, in the sheet light emitting apparatus as shown in FIG. 14B, and explained already, in which the prism sheet 103 is disposed to face above the light guiding plate 102 without providing the diffusion sheet above the light guiding plate for the purpose of the simplification and thinned type, visibility of the bright line and the drop portion of the brightness (R in FIG. A) are easy directly to reflect on the illumination light, and therefore a state of illumination is aggravated by the visibility of bright line and the drop portion of brightness.

SUMMARY OF THE INVENTION

It is, therefore an object of the present invention to provide a sheet light emitting apparatus in which a brightness of light in a light guiding plate is even and bright lines of light flux collected when passing through individual prisms do not appear.

To attain the above-mentioned object, a sheet light emitting apparatus according to a first aspect of the present invention comprises a light guiding plate of a translucent material and including light receiving and light emitting surfaces, a light source disposed to face the light receiving surface and a prism structure provided on the light receiving surface. The prism structure includes plural kinds of prisms having different apex angles.

A sheet light emitting apparatus according to a second aspect of the present invention comprises a light guiding plate of a translucent material and including light receiving and light emitting surfaces, a light source disposed to face the light receiving surface, and a prism structure provided an the light receiving surface, when an apex angle of a prism in said prism structure is α, a pitch of the prism is P, a height of the prism is h, a substantial maximum exit angle of light emitted from the light source is $θ_0$ and a refractive index of the light guiding plate is n. The prism structure is configured to satisfy a relation of, $$\{P-2h \times \tan(α/2)\} \times \cos\{(α/2)-θ2\} > 0.087 \text{ mm}$$

(but, $θ2 = \sin^{-1}[\{(α/2)-(90°-θ2)\}/n]$)

In a sheet light emitting apparatus according to a third aspect of the present invention, at least one kind of prism in the plural kinds of prisms having different apex angles is configured to satisfy a relation of, $$\{P-2h \times \tan(α/2)\} \cos\{(α/2)-θ2\} > 0.087 \text{ mm}$$

(but, $θ2 = \sin^{-1}[\{(α/2)-(90°-θ2)\}/n]$)

when an apex angle of the prism is α, a pitch of the prism is P, a height of the prism is h, a substantial maximum emitting angle of light emitted from the light source is $θ_0$ and a refractive index of the light guiding plate is n.

DETAILED DESCRIPTION OF THE PREFERRED EMBODIMENTS

Figure 1A:
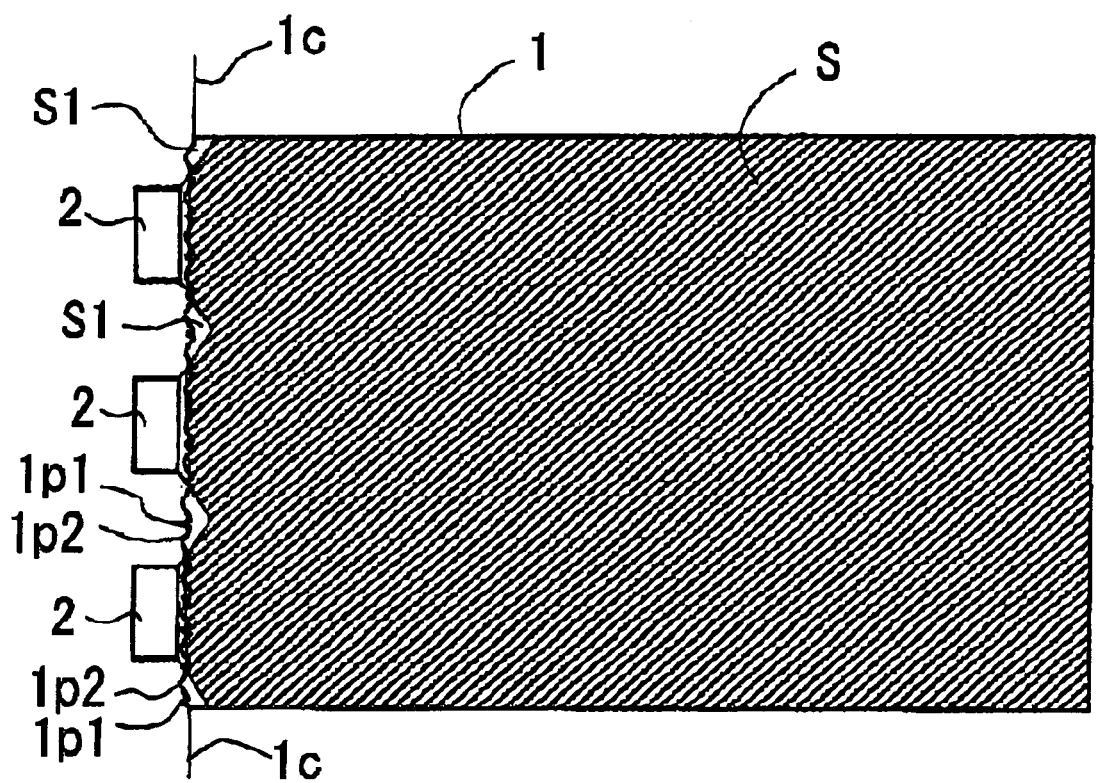
FIG. 1A is a top plan view showing a first embodiment of a sheet light emitting apparatus according to the present invention.

Hereinafter, several embodiments of the present invention will be explained with reference to the accompanying drawings.

A first embodiment a sheet light emitting apparatus according to the present invention is shown in FIGS. 1A to 10C. The sheet light emitting apparatus comprises a light emitting plate 1. The light guiding plate 1 is formed of a plate-shaped plastic material or the like having translucency and has a generally rectangular shape. The light guiding plate 1 has a light emitting surface 1a formed on an upper surface thereof, a lower 1b and a light emitting surface 1c formed on a side surface of the light guiding plate. The light emitting surface 1a is formed into a smooth surface by a mirror surface finishing or the like. Disposed to face the light receiving surface 1c is a light source 2, which is composed of three LEDs (light emitting diodes) in the shown embodiment. A prism sheet 3 is disposed to face the light emitting surface 1a of the light guiding plate 1 and a reflective sheet 4 is disposed to face the lower surface 1b of the light guiding plate 1 (see FIG. 2).

The lower surface 1b of the light guiding plate 1 is provided with a scattering surface having crimps, dots, uneven prisms or uneven concave and convex portions by printing as means for reflecting light entered in the light guiding plate 1 from the LEDs 2 toward the light emitting surface 1a.

Meanwhile, four surfaces of the light guiding plate 1, including the light emitting surface 1c are formed from smooth surfaces such as mirror surfaces.

Figure 2:
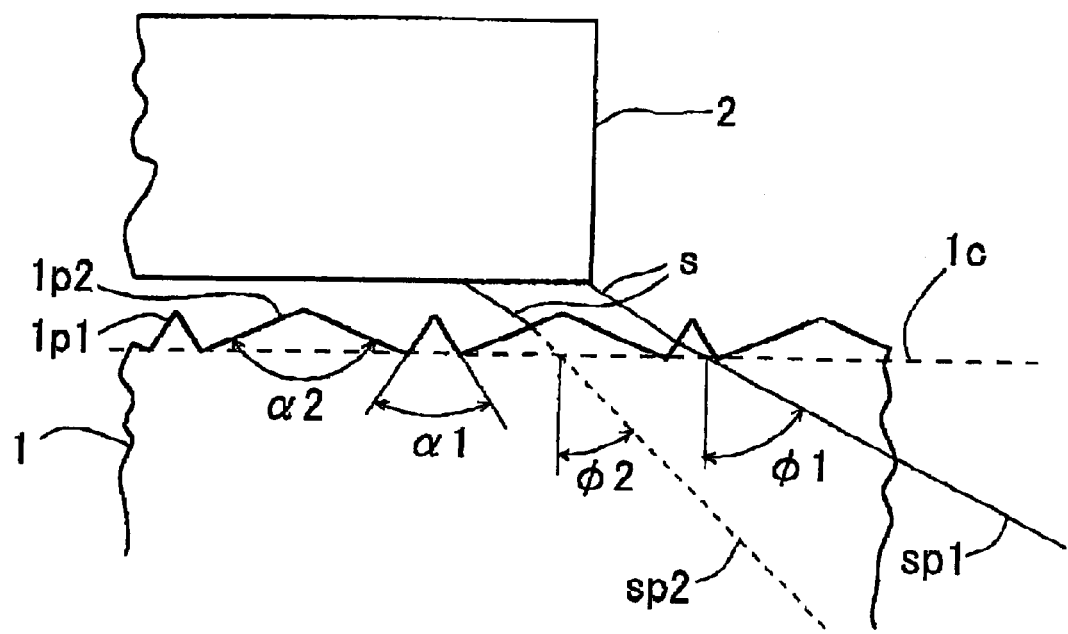
FIG. 2 is an enlarged partial top plan view showing a portion of LEDs in the sheet light emitting apparatus as shown in FIG. 1A.
Figure 3:
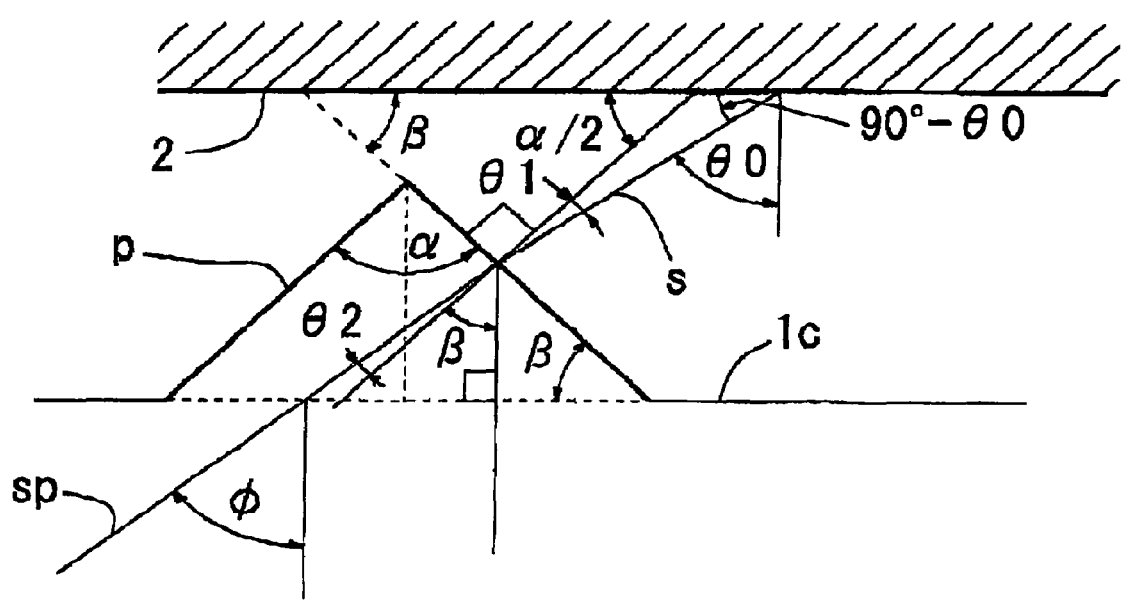
FIG. 3 is a view showing a direction of transmitted lights in prisms in the sheet light emitting apparatus as shown in FIG. 1A

As shown in FIG. 2, a prism structure is provided on the light receiving surface 1c of the light guiding plate 1. The prism structure includes first prisms 1p1 each having an apex angle of α1 and second prisms 1p2 each having an apex angle of α2, for example. The first and second prisms are disposed alternately and adjacently with respect to each other. Here, the apex angle α1 of each of the first prisms 1p1 is less than the apex angle α2 of each of the second prisms 1p2, in the present embodiment.

Figure 1B:
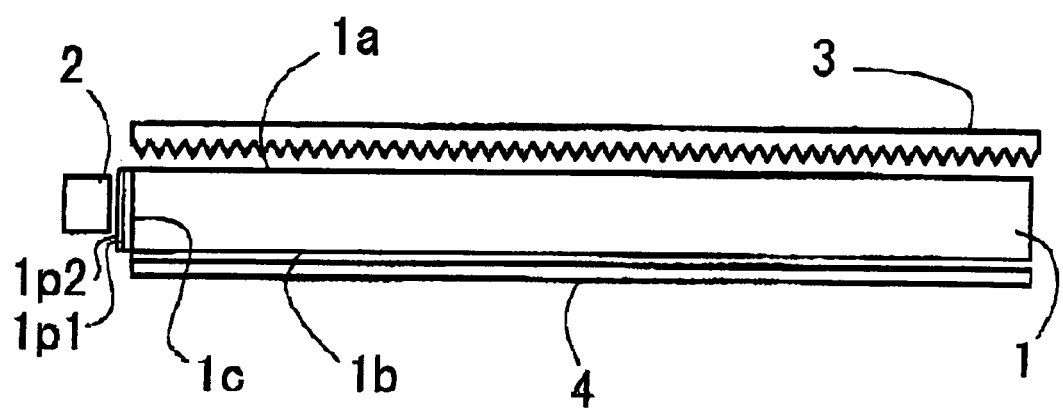
FIG. 1B is a side view of FIG. 1A.

In the above structure, when a predetermined current from a not-shown drive circuit is applied to the light source, namely, to the LEDs 2, the LEDs 2 emit lights including a predetermined color, for example, approximately white color. The lights from the LEDs 2 enter through the light receiving surface 1c into the light guiding plate 1, then are reflected totally on the upper surface, namely, the light emitting surface 1a as shown in FIG. 1(B), propagated widely within the light guiding plate 1 while repeating diffused reflection on the lower surface 1b, in the meantime, lights passed through the light emitting surface 1a by refraction thereof are emitted from the light emitting surface 1a toward the prism sheet 3.

A direction of the light from the light guiding plate 1 into the prism sheet 3 is arranged substantially perpendicularly, and the arranged light is emitted from the prism sheet, to direct an outside liquid crystal panel and so on, and illuminate it as illumination light. Here, the reflective sheet 4 operates to reflect light emitted in a lower direction by scattering of light on the lower surface 1b of the light guiding plate 1, return in the light guiding plate 1 again, to improve the usability of light.

In the process of generating the illumination light, incident lights s which are emitted from the LEDs 2 at a predetermined exit angle, for example, 55° and arrive the first and second prisms 1p1 and 1p2 at the light receiving surface 1c are refracted at the prism surfaces, respectively, and becomes translucent or transmitted lights sp1 and sp2 going within the light guiding plate 1, as shown in FIG. 2. Here, if an exit angle of the translucent or transmitted lights sp1 of the first prisms 1p1 at the horizontal light receiving surface 1c is φ1 and an exit angle of the translucent or transmitted lights sp2 of the second prisms 1p2 is φ2, a relation of φ1>φ2 is satisfied. As described in detail hereinafter, this is because of a relation that if an exit angle (φ) of light is larger, an apex angle of each prism is smaller. Here, in FIG. 1A, reference sign S is a light present area, in which inner lights exist in the light guiding plate 1, and reference sign S1 is a light absent area in which the inner lights do not exist. An angle of hypotenuse of the triangular light absent area S1 is equal to the maximum value of the exit angle φ1 of the translucent or transmitted lights sp1 or inner lights passed through the first prisms 1p1.

When the maximum value of φ1 becomes larger, a degree of entrance of light into the light guiding plate 1 in the light absent area S1 tends to be smaller.

Next, a relationship between an angle of a prism and an exit angle of transmitted lights into the light guiding plate 1 will be reviewed.

Here, in general when an inclined angle of each prism p is β, and an apex angle of the prism is α, a formula, β=90°+(α/2) is satisfied. When the exit angle of light s from the LEDs 2, in other words, an incident angle to the horizontal light receiving surface 1c is $\theta_0$, and an incident angle to a surface of the prism is $\theta_1$, the following formula is satisfied.

$$\theta_1 = \theta_0 - (90° + (\alpha/2)) = \theta_0 - \beta \quad (1)$$

$$((\because \alpha/2 = 90° - \theta_0 + \theta_1))$$

When an exit angle of refracting light at the surface of the prism is θ2, and a refractive index of the light guiding plate 1 is n, the following formula is satisfied by the Snell's law.

$$\begin{aligned} \theta 2 &= \sin^{-1}[(\sin\theta_1)/n] \\ &= \sin^{-1}[\{\sin(\theta_0 - 90° + (\alpha/2))\}/n] \\ &= \sin^{-1}[(\sin(\theta_0 - \beta)/n] \end{aligned} \quad (2)$$

Although θ2 is an angle to a normal line of the surface of the prism of the transmitted light sp, when an exit angle of the transmitted light sp which standards the horizontal light receiving surface 1c is φ, the following formula is satisfied.

$$\phi = \theta 2 + \beta = \theta 2 + 90° - (\alpha/2) \quad (3)$$

Figure 4:
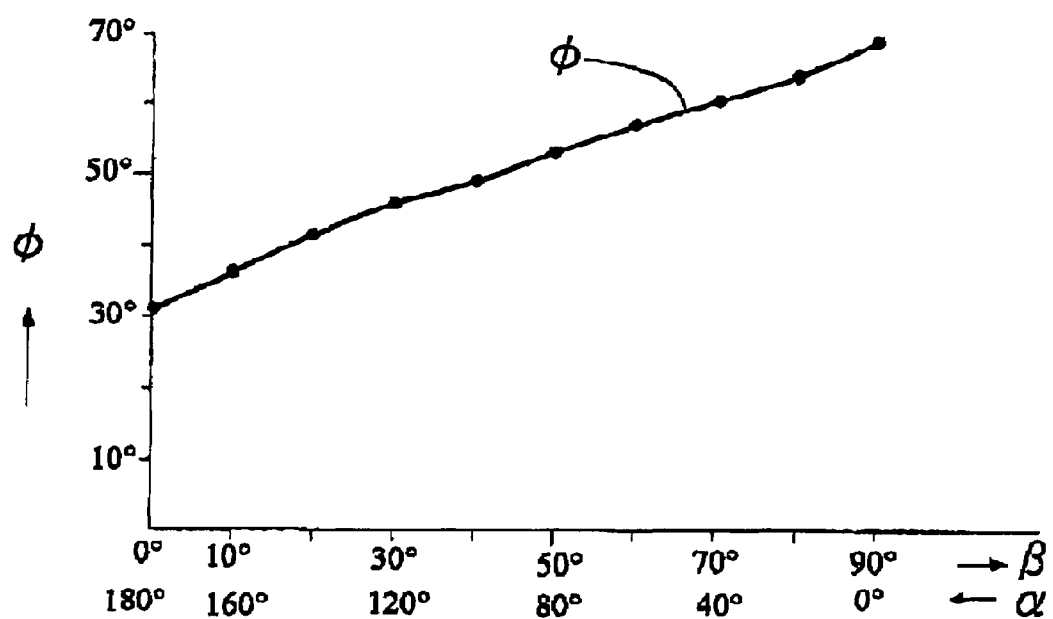
FIG. 4 is a graph showing a result obtained by a computation an angle of the transmitted lights of the prisms as shown in FIG. 3.

Now, If the exit angle θ° of the light s emitted from the LEDs 2 is 55°, and the refractive index n of the light guiding plate 1 is 1.585, an arithmetic result of the exit angle φ by changing the inclined angle β or apex angle α of the prism and by use of the above formulas (1), (2) and (3) is shown in FIG. 4. As shown in FIG. 4, as the inclined angle β is increased and the apex angle α is decreased, the exit angle φ of the transmitted light or inner light sp of each prism monotonically increases from approximately 30° to approximately 70°. In the first embodiment, the two kinds of first and second prisms 1p1 and 1p2 are used, as shown in FIG. 2, while, as the first prisms 1p1, prisms each having a small apex angle α are selected in order to large the exit angle φ of the transmitted light sp1, and as the second prisms 1p2, the apex angle α is increased in order to small the exit angle φ of the transmitted light sp2 (however, it is sufficiently smaller than 1801°). Here, selecting the apex angle α by which the exit angle φ becomes large, as the first prism 1p1 is to be small the entrance of light into the light guiding plate 1 at the light absent area S1 as shown in FIG. 1A, selecting the apex angle α by which the exit angle φ becomes small, as the second prisms 1p2 is for complementing a portion in which the transmitted light in the first prisms 1p1 does not exist, by the transmitted light sp2 in the second prisms 1p2 having the small exit angle φ.

Figure 5A:
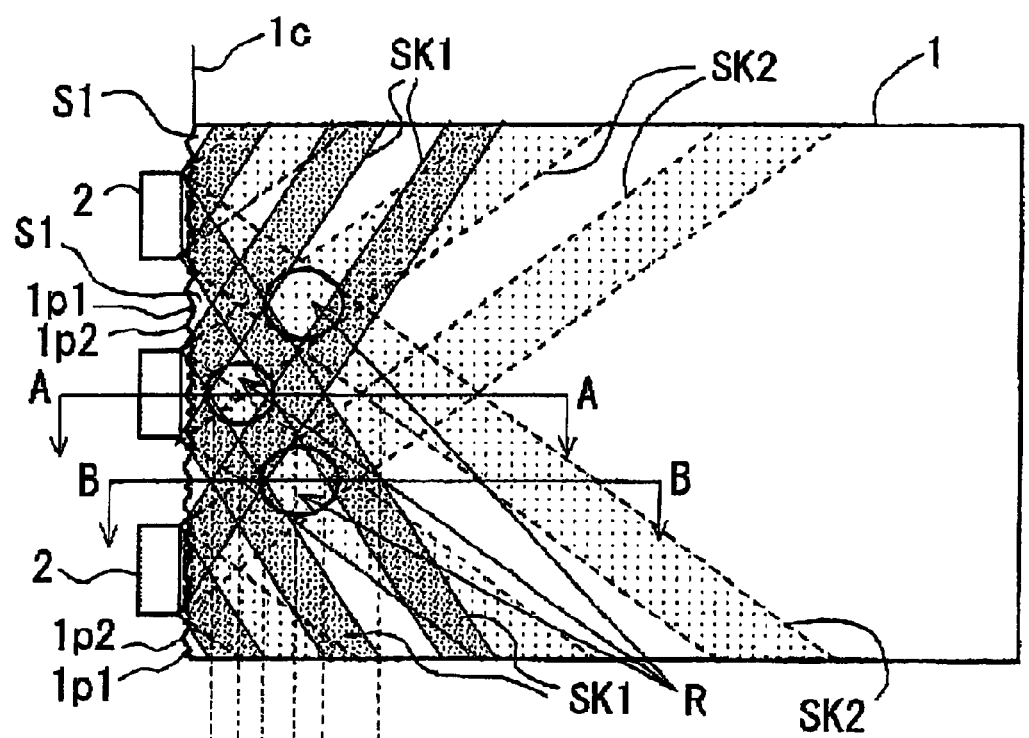
FIG. 5A is a view showing a distribution of collecting light fluxes in a light guiding plate in the sheet light emitting apparatus as shown in FIG. 1A.
Figure 5B:
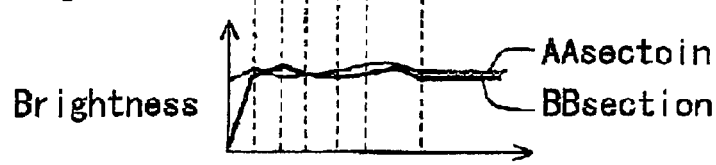
FIG. 5B is a view showing brightness of light in each of A—A and B—B sections in FIG. 5A

FIGS. 5A and 5B illustrate one example of a state of complement of the transmitted lights sp1 and sp2 in the first embodiment. In FIG. 5A, reference sign SK1 denotes collecting light flux that a plurality of transmitted fluxes sp1 are collected and configured every the first prisms 1p1 shown in FIG. 2, and reference sign SK2 denotes collecting light flux that a plurality of transmitted fluxes sp2 are collected and configured every the second prisms 1p2 shown in FIG. 2. As shown in FIG. 5A, the collecting light fluxes SK1 and SK2 extend to enlarge rightward and leftward (upward and downward in the drawing of FIG. 5A) beginning at the LEDs 2 into approximately mountain-like shapes. An exit angle of each of the collecting light fluxes SK1 is larger than that of each of the collecting light fluxes SK2. Thereby, the collecting light flux SK2 enters in areas R (see FIG. 16A) that are conventionally dark portions in spaces between the collecting light fluxes SK1 to complement the spaces. As a result, uniformity of brightness of light in the light guiding plate 1 in the embodiment is higher than that as in the prior art (see FIG. 5B). Regarding this point, a further explanation will be made.

Subsequently, a size of the prisms and pitch spaces of the prisms considered in the first embodiment will be described.

Figure 15:
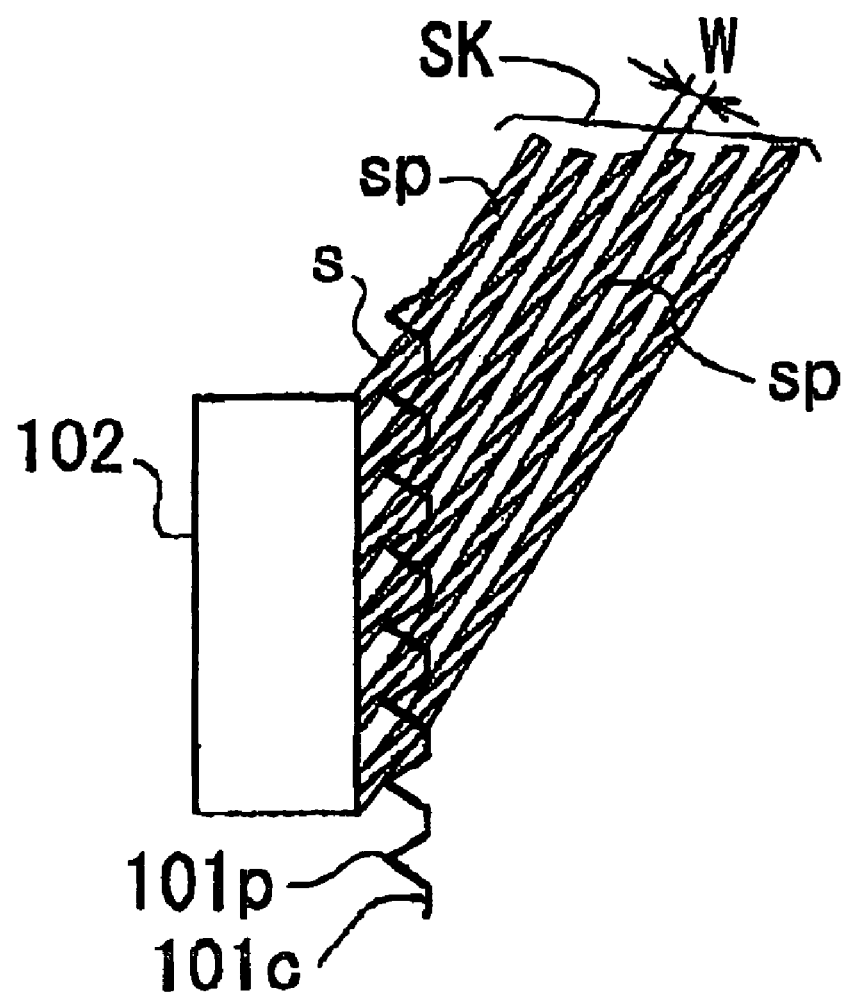
FIG. 15 is a view showing the transmitted lights of the prisms in the sheet light emitting apparatus as shown in FIG. 14A.

The consideration is carried out because of eliminating inconvenience that spaces among lights occurred by refraction of the individual prisms are narrow and therefore their lights may be recognized as one collected light entirety, as described already in the prior art (see FIG. 15).

A description by what judgment the height and pitch of the prisms are to be decided will be made below.

Figure 6:
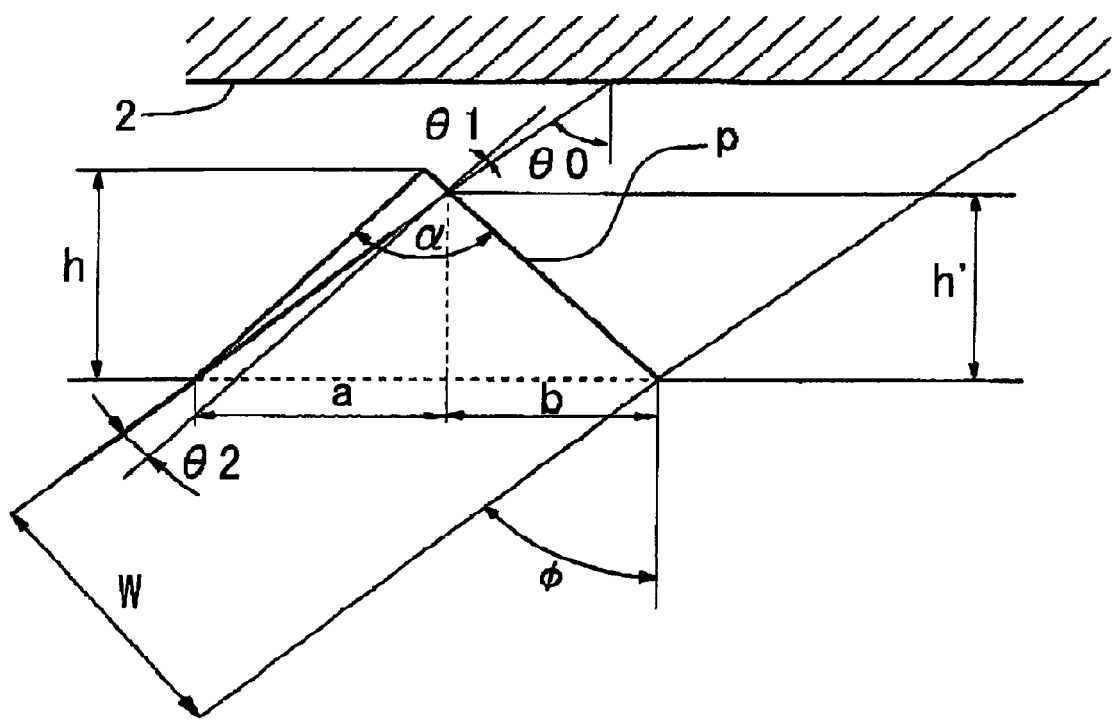
FIG. 6 is a view showing a width of each of the transmitted lights in the prisms in the sheet light emitting apparatus as shown in FIG. 1A.

FIG. 6 illustrates a width of light after refraction of the light entered into one prism p. In FIG. 6, h is a height of the prism, and α is an apex angle thereof. Light emitted from the LEDs 2 in a direction of $\theta_0$ is entered at an angle $\theta_1$ into an oblique surface of the prism, while, thereafter is refracted in direction of $\theta_2$, by the Snell's law and moves through a light guiding plate (not shown).

In order to cause the light emitted from the oblique surface of the prism at the $\theta_2$ to direct directly to an effective light emitting area of the light guiding plate, the light must be passed through a bottom of the prism. Therefore, when trading back the light of the direction of from a root of the prism, it is seen that the light is entered at a height h' of the incident plane.

In this connection, the h' is obtained by the following formula, $h'=2h\times\tan(\alpha/2)/\{\tan(\alpha/2)+\tan(\alpha/2+\theta_2)\}$ (∵ $a=h'\times\tan(\alpha/2+\theta 12)$, $b=h'\times\tan(\alpha/2)$ $a+b=2h\times\tan(\alpha/2)$ where, if a width of the bottom of the prism p is Wp, $Wp=2h\times\tan(\alpha/2)$ (4)

Next, a width W of the light entering into the light guiding plate passing through the prism is as follows.

$W=Wp\times\sin(90°-\phi)=Wp\times\cos\phi$

If the (4) formula is assigned to this formula, the following formula is satisfied.

$W=2h\times\tan(\alpha/2)\times\cos\phi$

Next, when the prisms p are disposed at a certain space, if a pitch of the prisms is P, a width Wf of each of flat portions without the prisms is as follows, in consideration with the formula (4).

$Wf=P-Wp=P-2h\times\tan(\alpha/2)$ (5)

Figure 7:
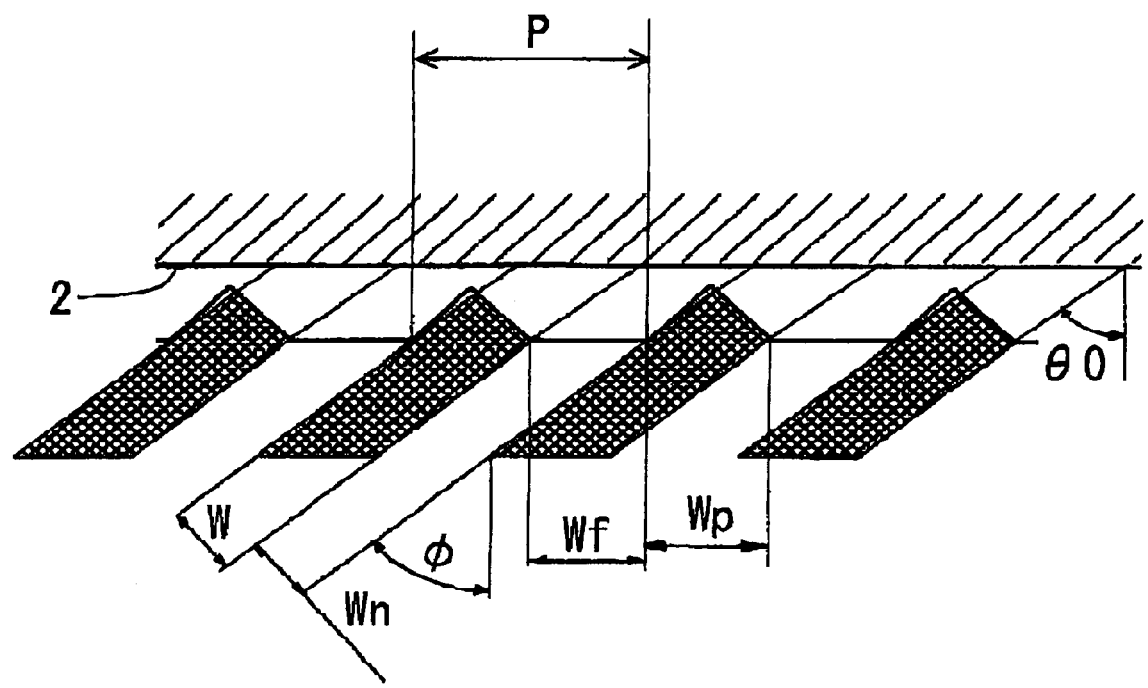
FIG. 7 is a view showing a space between the transmitted lights of each prism in the sheet light emitting apparatus as shown in FIG. 1A.

Here, because light refracted by the prisms is absent in the flat portions, the lights passed through the prisms are spaced with a Wn as shown in FIG. 7.

The space is obtained as follows.

$Wn=Wf\times\sin(90°-\phi)=Wf\times\cos\phi$

When the formulas (3) and (5) are assigned to this formula, the following formula is satisfied.

$Wn=\{P-2h\times\tan(\alpha/2)\}\times\cos(\theta 2+90°-(\alpha/2))$ (6)

However, the θ2 is represented in the formula (2). That is to say, $\theta 2=\sin^{-1}[\{\sin(\theta_0-90°+(\alpha/2))\}/n]$ As an example, the space Wn between the transmitted lights of their prisms is computed by citing sizes and pitches of the conventional prisms and by use of the formula (6). Where, if the apex angle α of the prism is 90°, the height h=0.33 mm, and the pitch P=0.18 mm, as $\theta_0=55°$, n=1.585, by computing using the formula (6), the following formula is satisfied.

$Wn = \{0.18 - 2 \times 0.03 \times \tan 45°\} \times \cos(45° + 6.3°)$ $= 0.12 \text{ mm} \times 0.62 \text{ mm} = 0.074 \text{ mm}$ By the way, it will be reviewed how much size of the space Wn is required between the transmitted lights of the prisms as shown in FIG. 7, below.

In general, it is said that resolving power of the person who a visual power is 1.0 is 1' (=1/60°). A distance between a display and the person when viewing a small display such as a mobile phone and a PDA is about 300 mm, at the present time, a space that eyes of the person can be discriminated is as follows.

300 mm×tan(1/60)=0.087 mm

Consequently, the space between the transmitted lights of each of the prisms having the aforementioned sizes becomes 0.074 mm which is less than a discriminated limit, and therefore it is not possible to individually separately discriminate the transmitted lights of each of the prisms, and as a result the collected light flux views as one thick combined line. In case of the backlight, it is important that light refracted by each prism does not view in the combined state as described above in order not to distinguish the bight line of the collected light flux separated rightward and leftward from a position near the LEDs. Therefore, it is necessary to set the above space Wn larger than 0.087 mm which is the discriminated limit. However, the computation as described above is made by specifying one direction θ1 of the exit light, actually, the exit lights in a various of directions are refracted to be the inner lights. For this reason, the computation is an indication consistently and the actual numeric values are acquired finally by an experiment. Anyway, because the size of the prism array is set without considering the discriminated limit with respect to the space Wn of the lights in the prior art, the space Wn is less than the discriminated limit a plurality of the lights are combined thickly to bring them into clear view as the bright line.

Subsequently, a concrete example of a size and an arrangement of the prisms satisfying conditions adopted in the first embodiment, in which the space Wn between the lights is less than discriminated limit and the individual light flux is recognizable will be explained.

Figure 8A:
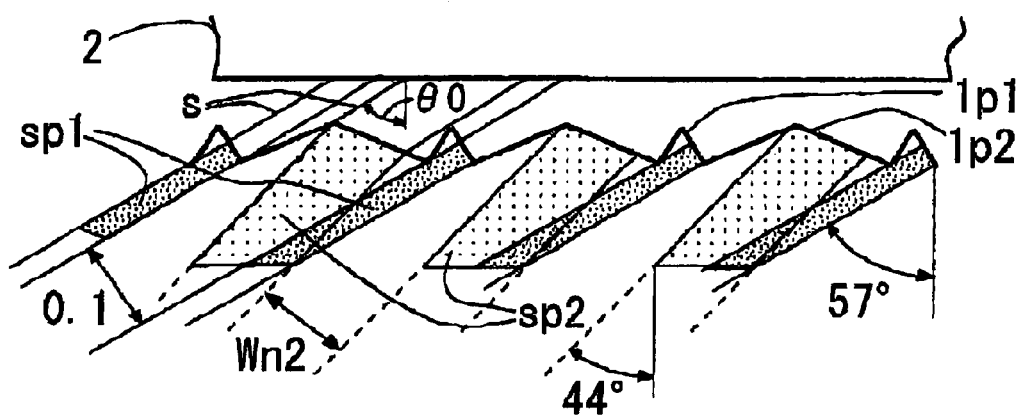
FIG. 8A is a view showing one example of the transmitted lights of the prisms in the sheet light emitting apparatus as shown in FIG. 1A.
Figure 8B:
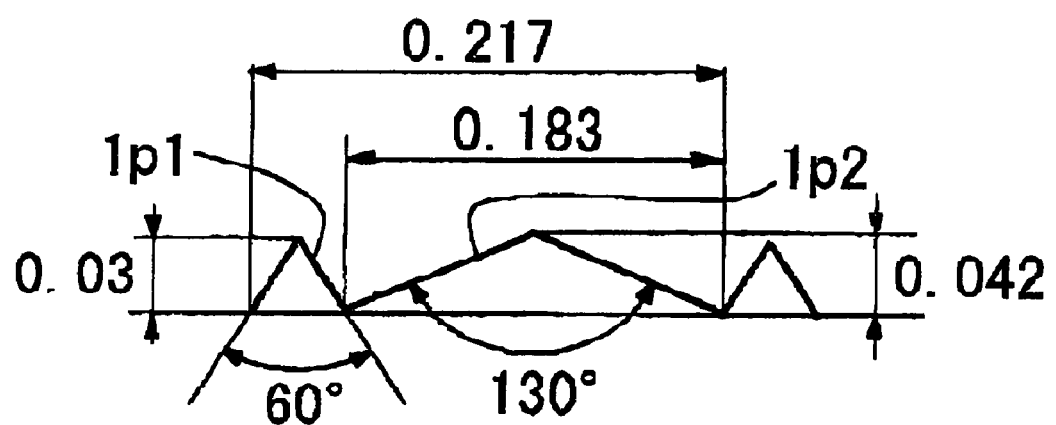
FIG. 8B is a view showing an arrangement and sizes in the prisms in the sheet light emitting apparatus as shown in FIG. 1A

FIGS. 8A and 8B illustrate the concrete example. As shown in FIG. 8A, the first and second prisms 1p1 and 1p2 are arranged alternately with respect to each other.

Here, as shown in FIG. 8B, it is assumed that the apex angle α of each of the first prisms 1p1 is 60°, the height h thereof is 0.03 mm and the apex angle α of each of the second prism 1p2 is 130°. In the conditions, to obtain a pitch to set the space Wn between the lights to a value, 0.1 mm larger than the discriminated limit, 0.087 mm, the following formula is obtained from the formula (6).

$$P = Wn/\cos(\theta 2 + 90° - (\alpha/2)) + 2h \times \tan(\alpha/2) \quad (7)$$

A computation is made by assigning the aforementioned values, the apex angle α of the first prism 1p1 is 60°, the height h is 0.03 mm, a targeted space Wn between the lights is 0.1 mm. At the present time, if the n is 1.585, the $\theta_0$ is 55°, the θ2 is obtained from the formula (2). As a result, the P is 0.217 mm. At this time, the width Wp of the bottom of each prism is obtained as follows from the formula (4).

$$Wp = 2h \times \tan(\alpha/2)$$

The space between the first prisms 1p1 is as follows in consideration with the formula (7).

$$P - Wp = Wn/\cos(\theta 2 + 90° - (\alpha/2))$$

The value of space is 0.188 mm.

Next, the height h of each second prism 1p2 provided entirety in the space is computed.

In the formula (4), namely, Wp=2h×tan(α/2), if the Wp is 0.183 mm, the α is 130°, the h is 0.042 mm.

FIG. 8 illustrates a state of the transmitted light sp1 and sp2 in the first and second prisms 1p1 and 1p2 having the sizes as shown in FIG. 8B, determined as described above. Here, the exit angles 57° and 44° of the transmitted lights sp1 and sp2 are values of φ, obtained by assigning α=60° α=130° in the formula (3), respectively. The space between the transmitted lights s1p of the first prisms 1p1 is 0.1 mm larger than the discriminated limit, while the space Wn2 of the transmitted light s2p of the second prisms 1p2 is not necessarily larger than the discriminated limit. However, even in such a case, each of the exit angles of the transmitted lights is 44°, which is less relatively and therefore there is no special damage because of the bright line difficult to distinguish.

Figure 9A:
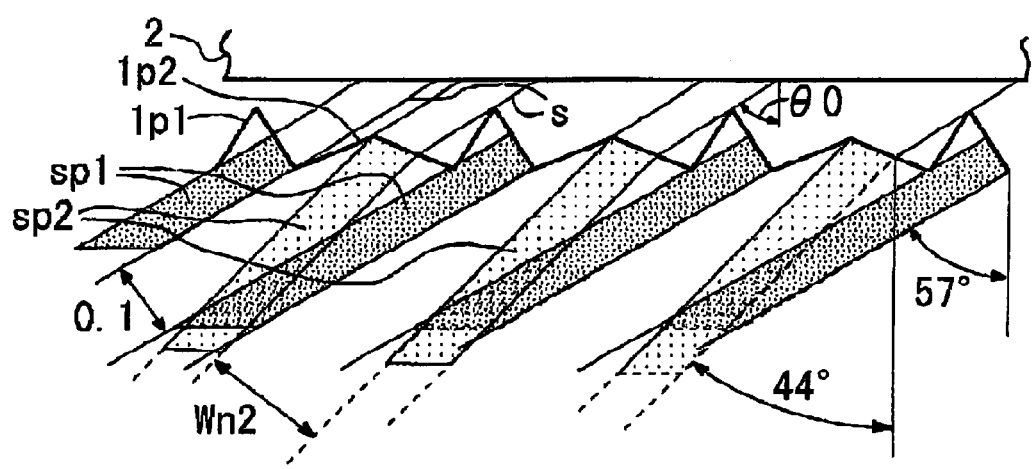
FIG. 9A is a view showing another example of the transmitted lights of the prisms in the sheet light emitting apparatus as shown in FIG. 1A.
Figure 9B:
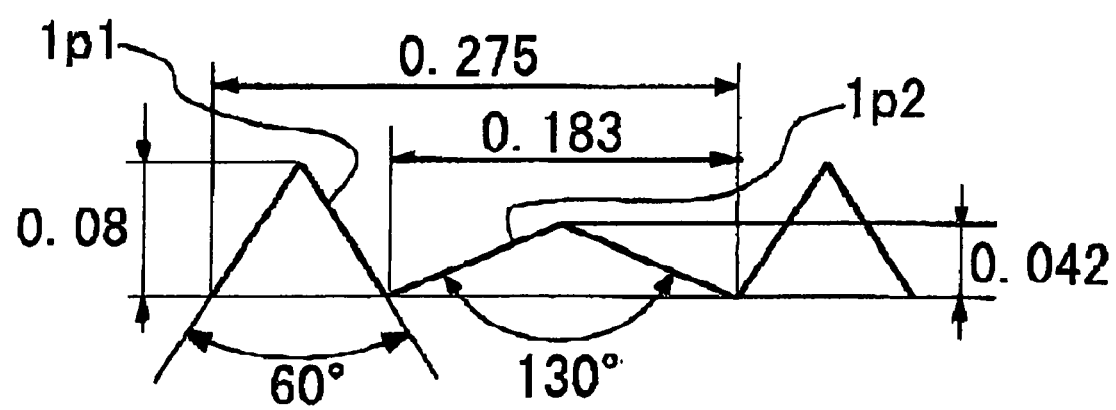
FIG. 9B is a view showing an arrangement and sizes in the prisms in the sheet light emitting apparatus as shown in FIG. 1A.

Next, if the space between the first prisms 1p1 remains fixed to the aforementioned 0.183 mm and the height of each first prism is increased, it is possible to increase the amount of light of the transmitted lights. The example is shown in FIGS. 9A and 9B. As shown in FIG. 9B, if the apex angles α of the first prisms are held to 60° as is, each height h is 0.08 mm, in a state that the space Wn, 0.1 mm between the transmitted lights is secured, as described in FIG. 9A, the width of each of the transmitted lights s1p in the first prisms 1p1 can be widened than that as in FIGS. 8A and 8B. In this case, the width of each of the transmitted lights in the second prisms reduces than that as in FIGS. 8A and 8B. This is because, by the heights of the first prisms 1p1 being increased, the exit angles θ0 (55°) of incident lights s which are shielded by the first prisms 1p1 are increased and an entering range in the second prisms 1p2 reduces. In this way, further enhancement of a uniform brightness of the light guiding plate 1 can be achieved by selecting suitably the heights of the first prisms by adjusting the widths of the transmitted lights s1p and s2p of the first and second prisms and by taking a balance of the brightness of the transmitted lights.

Figure 10A:
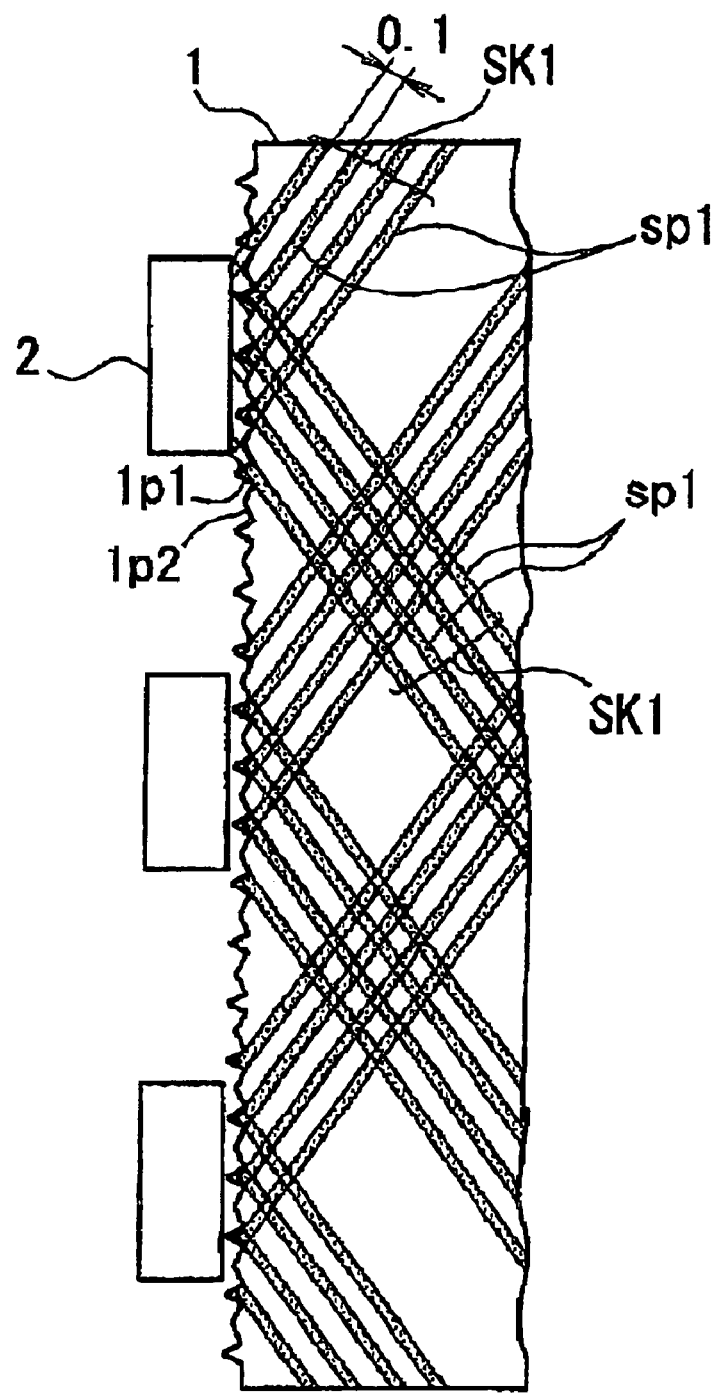
FIG. 10A is a view showing a distribution of the transmitted lights of first prisms in first and second prisms to which the arrangement and sizes in FIG. 9B are applied.
Figure 10B:
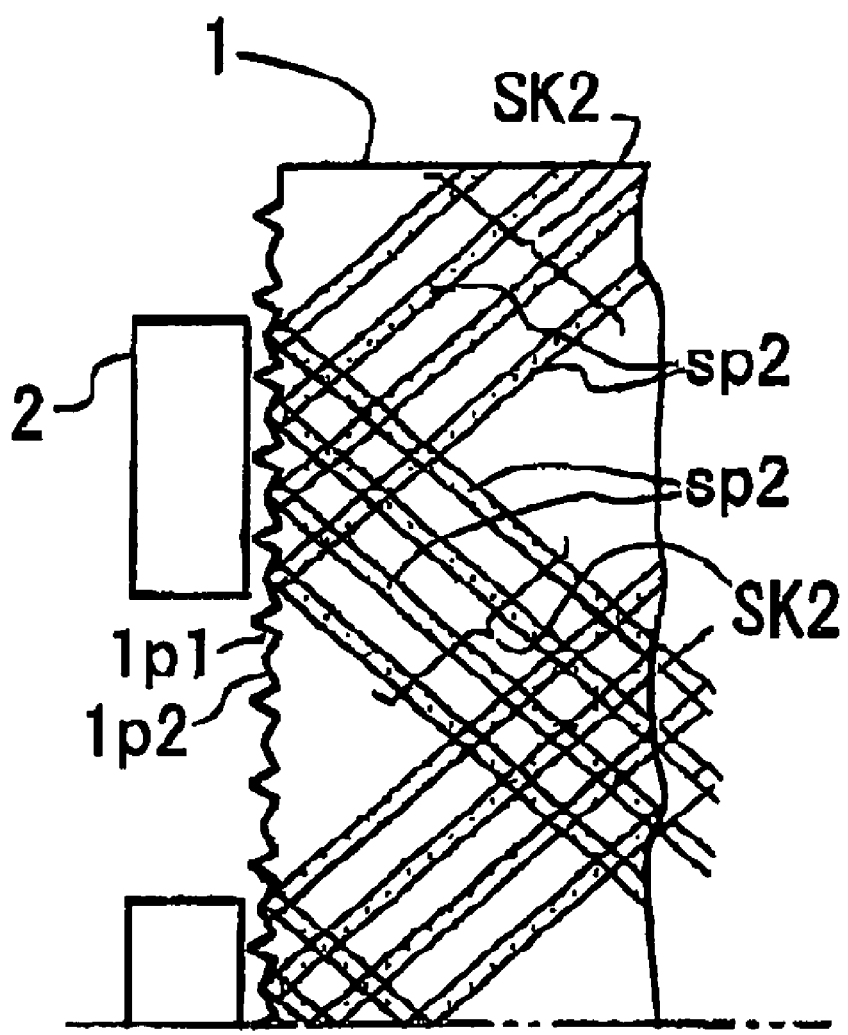
FIG. 10B is a view showing a distribution of the transmitted lights in the second prisms.
Figure 10C:
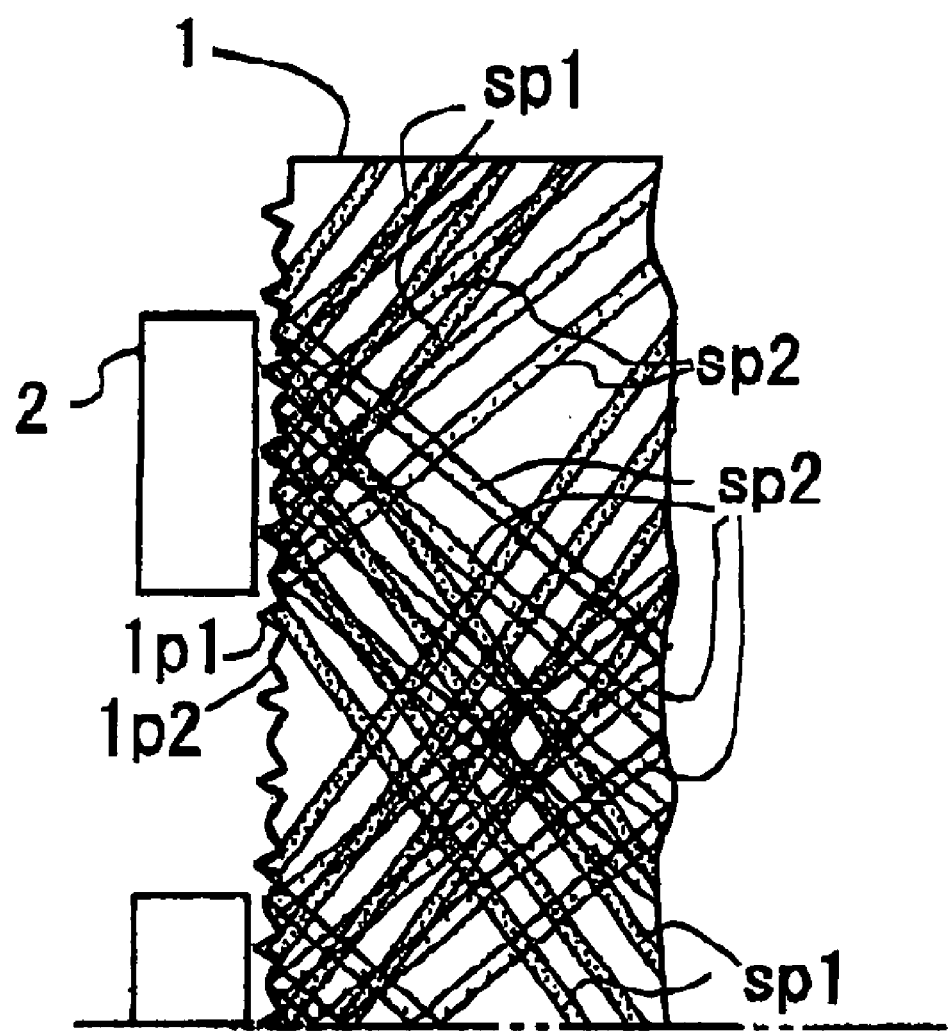
FIG. 10C is a view showing distributions of the transmitted lights in the first and second prisms.

Next, FIGS. 10A to 10C illustrate distributed states of the inner lights in the light guiding plate (limiting to a portion in the vicinity of the LEDs 2), using the prisms having the sizes shown in FIGS. 9A and 9B. Here, FIG. 10B illustrates the distributed state of the transmitted lights sp1 of the first prisms 1p1, FIG. 10B illustrates the distributed state of the transmitted lights sp2 of the second prisms 1p2, and FIG. 10C illustrates an actual state in which transmitted lights sp1 and sp2 are mixed. As shown in FIG. 10A, the transmitted light sp1 is separated rightward and leftward (upward and downward in the drawing) into approximately the mountain shape from each of the first prisms 1p1 and the separated transmitted lights proceed within the light guiding plate 1. As a result, collecting light fluxes SK1 comprising a plurality (four herein) of transmitted lights sp1 corresponding to the incident light from one LED 2 are separated rightward and leftward into the mountain shape and proceed in the light guiding plate. The collecting light fluxes SK1 correspond to the SK1 shown in FIG. 5A. Here, each of spaces between light fluxes constituting the collecting light fluxes SK1 is 0.1 mm, which is larger than the discriminated limit as described above, and each light flux can be discriminated, as a result, all the collecting light fluxes SK1 are not recognized as one thick combined bright line so that the bright line is not seen. In addition, each of the exit angles of the transmitted lights sp1 and inner fluxes SK1 to an inner portion of the light guiding plate 1 is 57° (see FIG. 9A).

As shown in FIG. 10B, the transmitted light sp2 is separated rightward and leftward (upward and downward in the drawing) into approximately the mountain shape from each of the second prisms 1p2 and the separated transmitted lights proceed within the light guiding plate 1. As a result, collecting light fluxes SK2 comprising a plurality (four herein) of transmitted lights sp 2 corresponding to the incident light from one LED 2 are separated rightward and leftward into the mountain shape and proceed in the light guiding plate. In this connection, the spaces between the transmitted lights sp2 are larger than 0.1 mm as Wn2 shown in FIG. 9A. The collecting light fluxes SK2 correspond to the SK2 shown in FIG. 5A.

In addition, each of the exit angles of the transmitted lights sp2 and inner fluxes SK2 to an inner portion of the light guiding plate 1 is 44° (see FIG. 9A).

Next, in FIG. 10C, the distributed states of the transmitted lights sp1 of the first prisms 1p1 and transmitted lights sp2 of the second prisms 1p2 are shown together. According to this, the transmitted lights sp2 of the second prisms 1p2 enter into areas (corresponding to R in FIG. 5A) in which bundles of the transmitted are not existed (corresponding to the SK1), the areas are complemented.

FIG. 5B illustrates distributions of the brightness in A—A and B—B sections in FIG. 5A in the case that the prisms shown in FIGS. 9A and 9B are used.

Figure 16A:
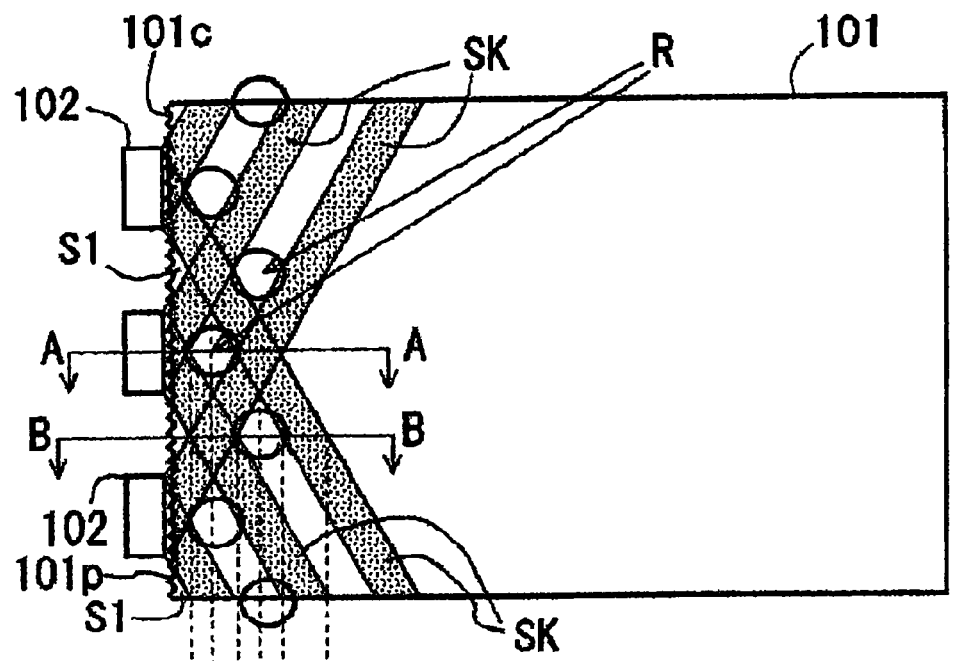
FIG. 16A is a view showing a distribution of collecting light fluxes in a light guiding plate in the sheet light emitting apparatus as shown in FIG. 14.
Figure 16B:
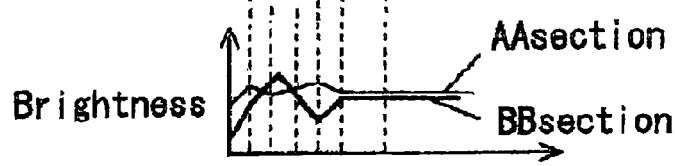
FIG. 16B is a view showing brightness of light in each of A—A and B—B sections in FIG. 16A

According to this, reduction of the brightness in the R portion is avoided and therefore a more uniform brightness is obtained than as in the prior art (see FIG. 16A).

In this way, according to the sheet light emitting apparatus in the first embodiment, by providing the first prisms 1p1, each having the small apex angle and the second prisms 1p2, each having the large apex angle, and by setting sizes of pitches P and so on of the first prisms so as to satisfy the predetermined conditions, first, the spaces between the transmitted lights sp1 in which the incident lights from the LEDs 2 are refracted in the first prisms 1p1 are set to be large than the predetermined discrimination values to be capable of eliminating the visibility of the bright lines of the collecting light fluxes SK1.

Figure 17:
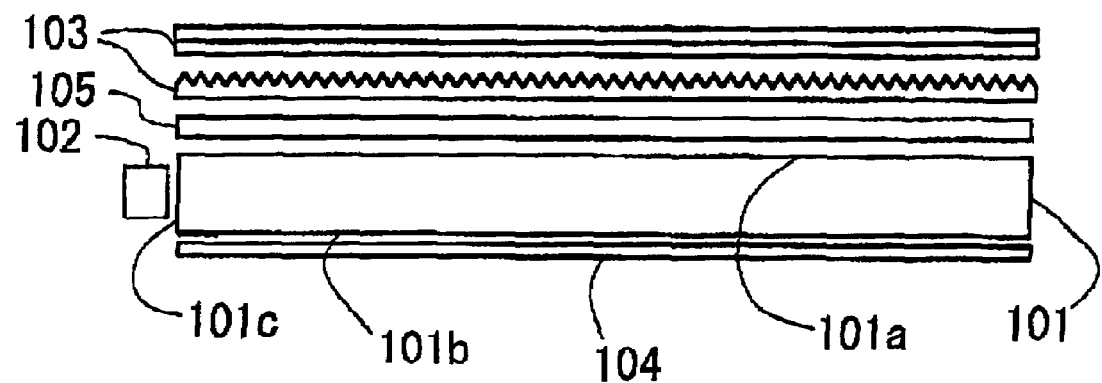
FIG. 17 is a side view showing still another conventional sheet light emitting apparatus.

Secondary, the transmitted lights sp2 in which the incident lights from the LEDs 2 are refracted in the second prisms 1p2, complement the gaps of the collecting light fluxes SK1 of the transmitted lights sp1 of the first prisms 1p1 in the interior of the light guiding plate 1. The uniformity of brightness can be enhanced. In this case, in the first embodiment, because the bright lines are prevented from generating in the light guiding plate 1, and therefore the uniformity of brightness is achieved, the sufficient quality of the illumination light can be secured, even in the sheet light emitting apparatus as shown in FIGS. 1A and B, in which the diffusion sheet 105 as shown in FIG. 17 is not provided in order to simplify the apparatus and the quality of the brightness in the light guiding plate is reflected directly on that of the illumination light.

In addition, although the two kinds of prisms, whose apex angles are different, are provided on the light guiding plate in the first embodiment, the present invention is not limited to this embodiment, the similar effect can be obtained by providing more than three kinds of prisms whose apex angles are different, on the light guiding plate.

A second embodiment of a sheet light emitting apparatus according to the present invention, which has an arrangement of prisms, different from the arrangement of the prisms shown in FIGS. 9A and B will be explained with reference to FIG. A to C. The other structure in the second embodiment is the same as that of the first embodiment as shown in FIGS. 1A and 1B.

In the second embodiment, two pairs of first prisms 1$p$1 are continuously disposed and one or more second prisms 1$p$2 are disposed (see FIGS. A to C). In an example as shown in FIG. 11B, an apex of each of the first prisms 1$p$1 is 60°, a height h thereof is 0.08 mm, and two first prisms 1$p$1 are spaced through a flat part 1$f$ whose width is 0.183 mm.

Figure 11A:
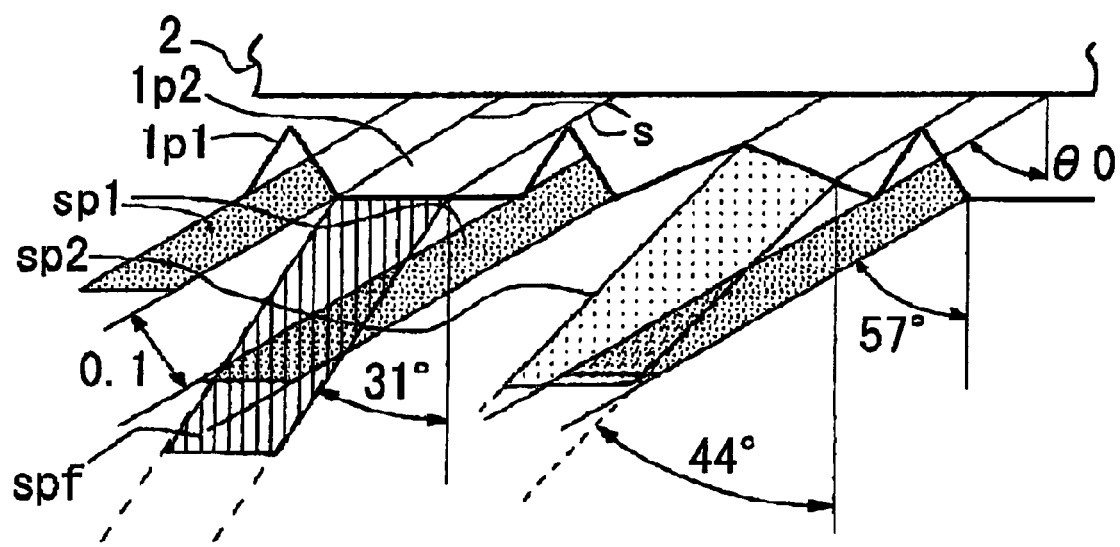
FIG. 11A is a view showing transmitted lights in a second embodiment of the sheet light emitting apparatus according to the present invention.
Figure 11B:
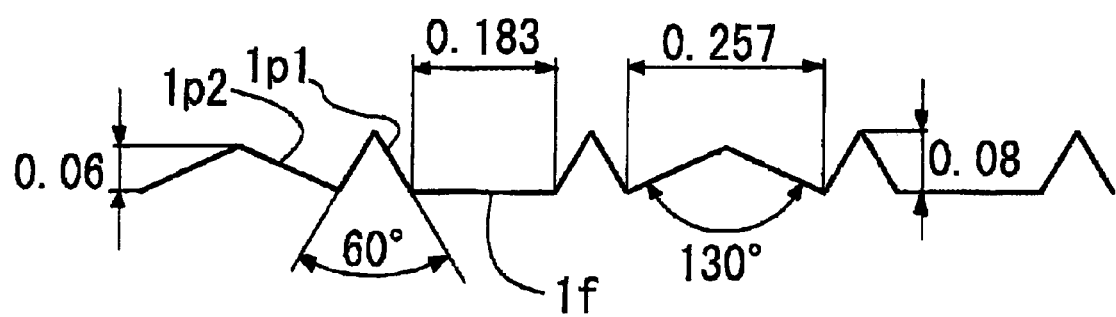
FIG. 11B is a view showing one example of an arrangement and sizes of prisms in the second embodiment as shown in FIG. 11A.

As shown in FIG. 11B, one second prism 1$p$2 is disposed outside of each of the two first prisms 1$p$1 in such a manner that the second prism is connected with each first prism. A height h of each of the second prisms 1$p$2 is 0.06 mm, an apex angle thereof is 180°, and a width thereof is 0.257 mm. In other words, spaces between the first prisms are 0.183 mm and 0.257 mm, as shown in FIG. 11B.

As shown in FIG. 11A, there are generated transmitted lights s1$f$ (exit angles thereof are 31° from the formula (3) if the apex angles are 180°) of the flat parts 1$f$ between the first prisms 1$p$1 other than transmitted lights s1$p$ and s2$p$ in the first and second prisms 1$p$1 and 1$p$2, if these three transmitted lights are balanced, they are complementary to further enhance the uniformity of brightness of the entire light guiding plate 1. In this case, although there are two cases of long and short spaces between the transmitted lights sp1 in the first prisms 1$p$1, pursuant to the spaces between the prisms 1$p$1, each space is 0.1 mm in the short case, each of the transmitted lights is recognized and therefore visibility of bright lines of the transmitted lights are avoided.

Figure 11C:
FIG. 11C is a view showing anther example of an arrangement and sizes of prisms in the second embodiment as shown in FIG. 11A.

Meanwhile, in the example as shown in FIG. 11B, although the one second prism is disposed between the two continued first prisms 1$p$1, instead, two continued second prisms 1$p$2 may be disposed between two continued first prisms 1$p$1, as shown in FIG. 11C. In this case, it is also possible to arrange a plurality of first prisms and a plurality of second prisms, alternately.

In the aforementioned first and second embodiments, although the case that the apex angle of each fist prism 1$p$1 is 60°, the apex angle of each second prism 1$p$2 is 130°, has been described, the present invention is not limited to these numeric values, it is possible to achieve the same advantageous effect in which the bright lines are not distinguished and the uniformity of brightness light can be enhanced by using the first prisms having relatively large apex angles and the second prisms having relatively small apex angles and by selecting the height h and a pitch P of ea first prism so that gaps Wn (see the formula (6)) between the transmitted lights of the first prisms are more sufficiently than the discriminated limit, 0.087 mm.

Figure 12:
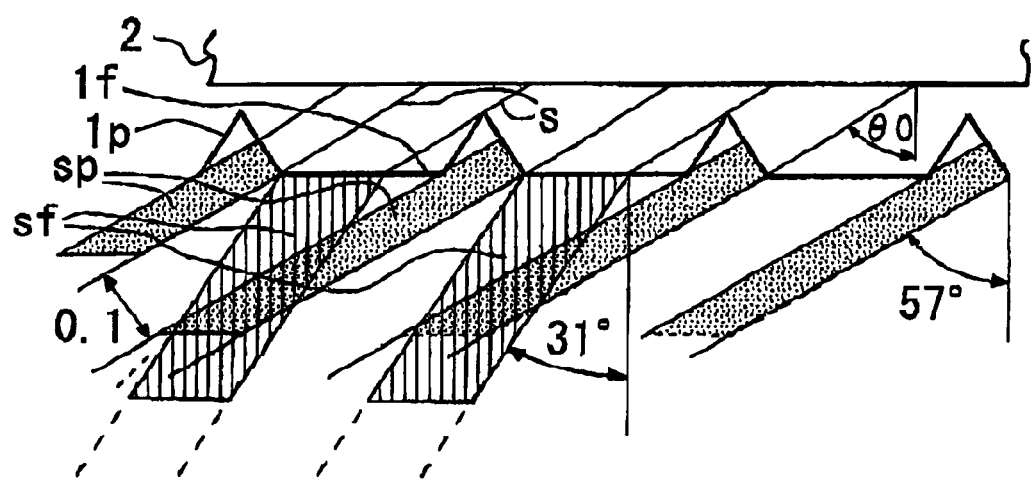
FIG. 12 is a view showing transmitted lights, an arrangement and sizes of prisms in a third embodiment of the sheet light emitting apparatus.
Figure 13A:
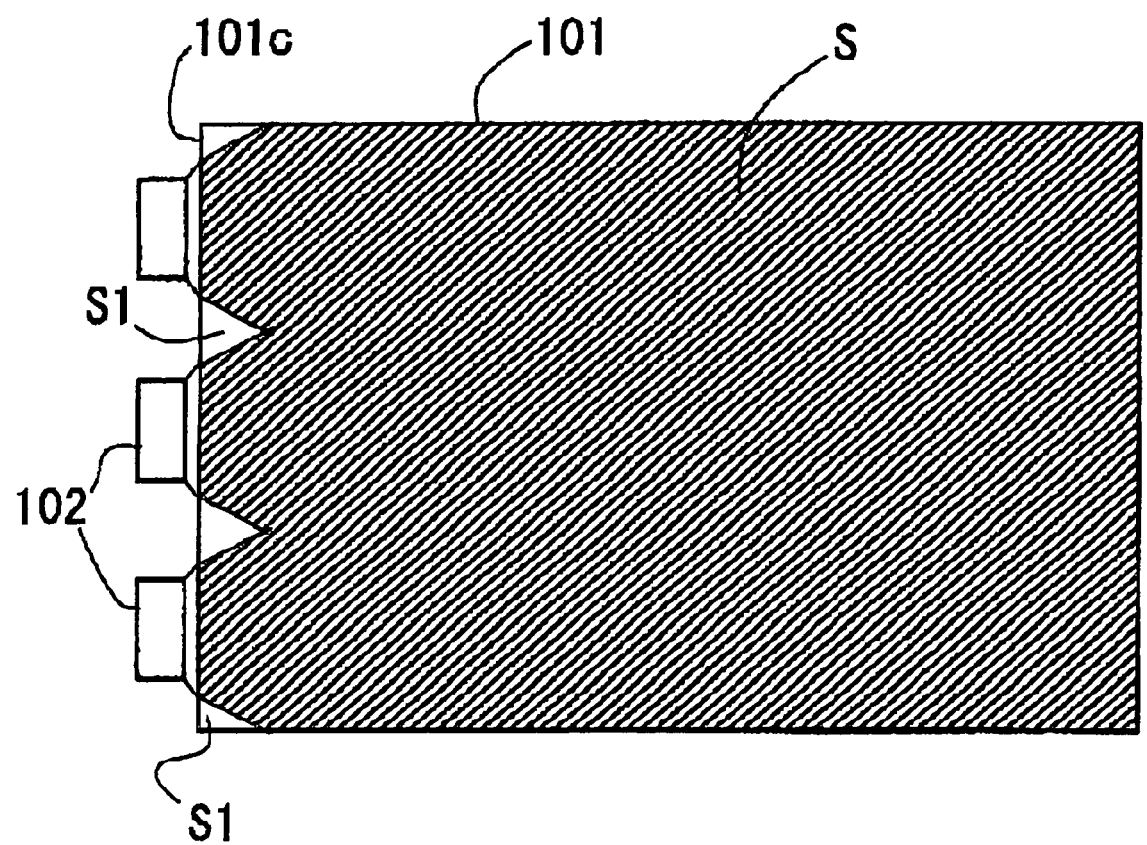
FIG. 13A is a top plan view showing a conventional sheet light emitting apparatus.
Figure 13B:
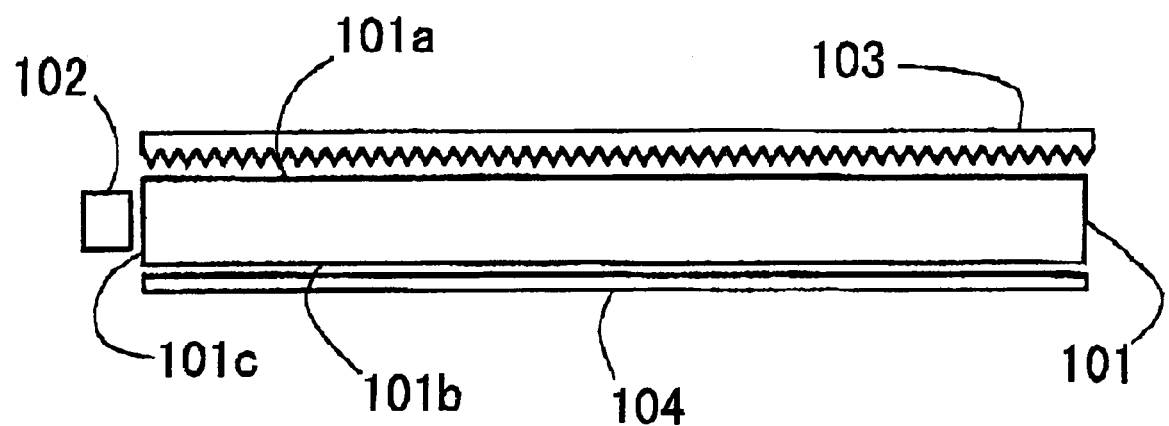
FIG. 13B is a side view of the sheet light emitting apparatus as shown in FIG. 13A.
Figure 13C:
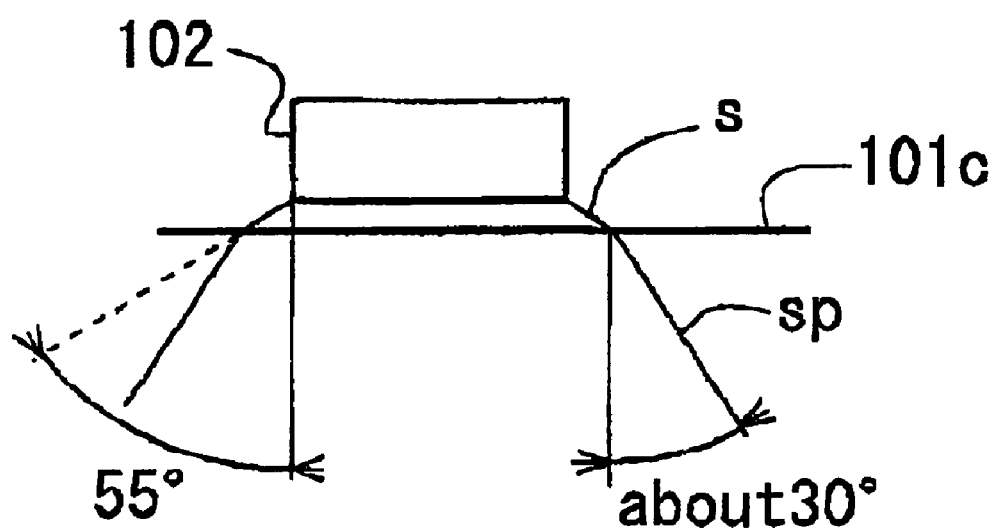
FIG. 13C is a view showing transmitted lights in prisms in the sheet light emitting apparatus as shown in FIG. 13A.
Figure 14A:
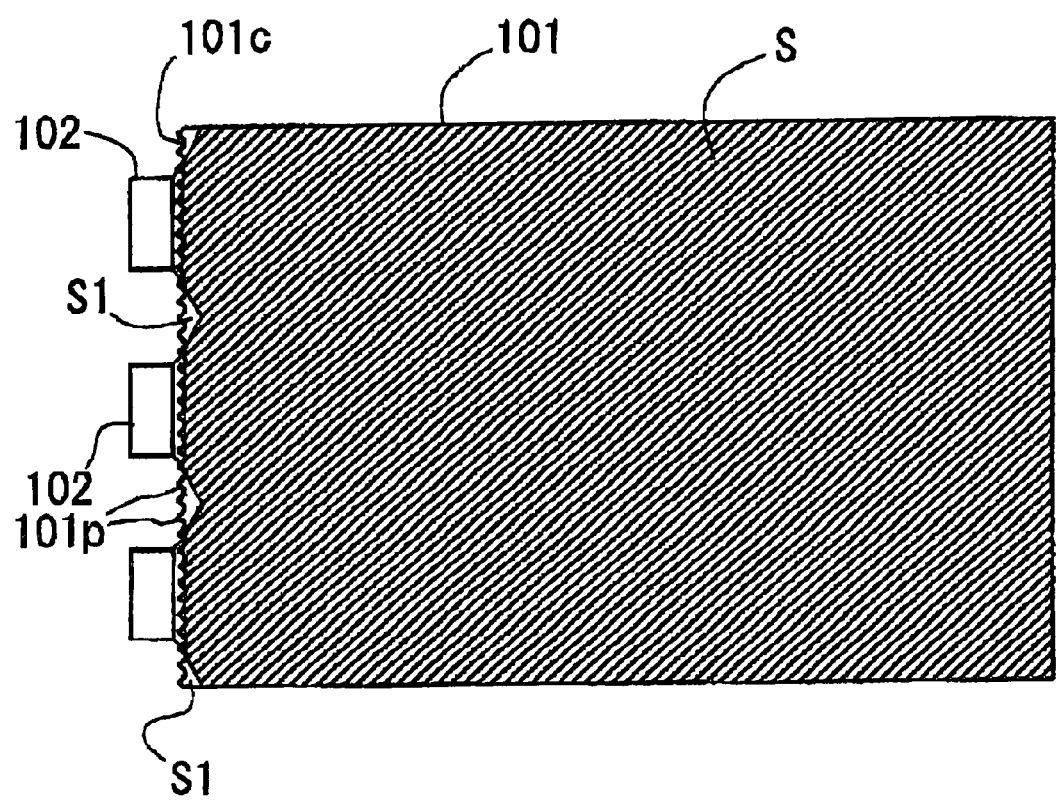
FIG. 14A is a top plan view showing another conventional sheet light emitting apparatus.
Figure 14B:
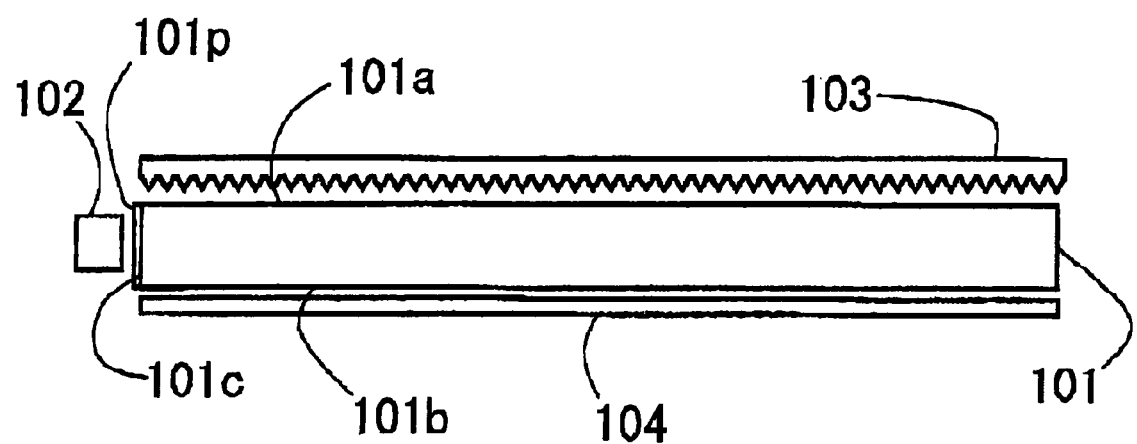
FIG. 14B is a side view of the sheet light emitting apparatus as shown in FIG. 14A.
Figure 14C:
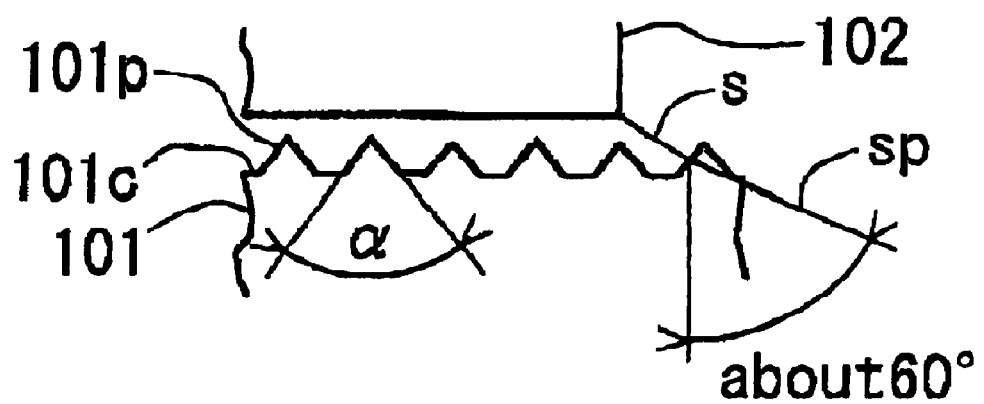
FIG. 14C is a view showing transmitted lights in prisms in the sheet light emitting apparatus as shown in FIG. 14A.

A third embodiment of the present invention will be explained with reference to FIG. 12 below. As shown in FIG. 12, one kind of prisms 1$p$ only are arranged on a side surface of the light guiding plate 1 in the third embodiment. An apex angle α, a height h and pitch P of each of the prisms are the same as the arrangement of the first prisms 1$p$1 as shown in FIGS. 9A and 9B, α=60°, h=0.08 mm and P=0.257 mm, areas at paces (0.183 μm) between the prisms 1$p$ are flat parts 1$f$.

The incident lights s from the LEDs 2 transmit the prisms 1$p$ by refraction to generate transmitted lights sp and transmit the flat parts 1$f$ by refraction to generate transmitted light sf. Here, exit angles of the transmitted lights sp and sf are 57° and 31°, respectively, by the principle explained already. Each of the spaces between the transmitted lights sp is 0.1 mm, by the principle explained already.

In the third embodiment, the prisms comprise one kind, the complement to the R parts as shown FIG. 5A cannot be carried out, and the brightness in the light guiding plate cannot be uniformed sufficiently. However, because the prism arrangement is configured in such a manner that the space between the transmitted light sp of each prism 1$p$ is 0.1 mm, and this is considered to be large then the discriminated limit, the bright lines of the collecting light fluxes widened into the mountain-shapes, generated in the prior art, are not distinguished and therefore the quality of illumination is enhanced. In addition, without being limited to the numeric values in this example, the effect that the visibility of the bright lines is eliminated is obtained, by using the prisms of one kind and by selecting the apex angle α, the height h and the pitch P of each prism so that gaps Wn (see the formula (6)) between the transmitted lights of the prisms are more sufficiently than the discriminated limit, 0.087 mm.

As described above, according to the present invention, in the sheet light emitting apparatus having the light guiding plate, the LEDs as the light source, and the prisms formed on the light receiving surface of the light guiding plate facing the LEDs, it is possible to eliminate the visibility of the bright lines generated in the light guiding plate by securing the space between the transmitted lights of each prism to more than a predetermined value and to complement the areas in which the transmitted lights in the prisms are not by use of the plural kinds of prisms, and to increase the uniformity of brightness in the light guiding plate, whereby accomplishing a good illuminated state of light.

What is claimed is:

1. A sheet light emitting apparatus, comprising:
   a light guiding plate of a translucent material and including light receiving and light emitting surfaces;
   a light source disposed to face said light receiving surface; and
   a plurality of kinds of prisms provided on said light receiving surface and having different apex angles;
   wherein a size and a pitch of arrangement of at least one kind of prisms of the plurality of kinds of prisms are selected so that bright lines of translucent lights exiting the prisms are invisible, wherein said plurality of kinds of prisms comprises at least a first kind of prism and a second kind of prism, and the first and second kinds of prisms are arranged alternately with respect to each other.

2. The sheet light emitting apparatus according to claim 1, wherein said plurality of kinds of prisms are disposed alternately and adjacently.

3. The sheet light emitting apparatus according to claim 1, further comprising a prism sheet disposed to face said light emitting surface.

4. The sheet light emitting apparatus according to claim 1, wherein said light guiding plate has a surface opposing to the light emitting surface, and further comprising a reflective sheet disposed to face the surface of the light guiding plate.

5. The sheet light emitting apparatus according to claim 1, wherein a difference between bright and dark portions of illumination light is generally moderated, by the bright and dark portions of light generated in each of the plural kinds of prisms due to operation thereof being complemented with respect to each other.

6. The sheet light emitting apparatus according to claim 1, wherein the first kind of prism of the plurality of kinds of prisms has an exit angle of light transmitted through the first kind of prism of $\Phi 1$, the second kind of prism of the plurality of kinds of prisms has an exit angle of light transmitted through the second kind of prism of $\Phi 2$, and $\Phi 1$ is greater than $\Phi 2$.

7. A sheet light emitting apparatus, comprising:
a light guiding plate of a translucent material and including light receiving and light emitting surfaces;
a light source disposed to face said light receiving surface; and
a prism structure provided on said light receiving surface, where an apex angle of a prism in said prism structure is $\alpha$, a pitch of the prism is P, a height of the prism is h, a substantial maximum emitting angle of light emitted from the light source is $\theta_0$ and a refractive index of the light guiding plate is n, said prism structure having a relation, $$\{P - 2h \times \tan(\alpha/2)\} \times \cos\{(\alpha/2 - \_\theta 2\} > 0.087 \text{ mm}$$

(but, $\theta 2 = \sin^{-1}[\{(\alpha/2) - (90° - \_\theta 2)\}/n]$).

8. The sheet light emitting apparatus according to claim 7, wherein a difference between bright and dark portions of illumination light is generally moderated, by the bright and dark portions of light generated in each of the plurality of kinds of prisms due to operation thereof being complemented with respect to each other.

9. A sheet light emitting apparatus comprising:
a light guiding plate of a translucent material and including light receiving and light emitting surfaces;
a light source disposed to face said light receiving surface; and
a plurality of kinds of prisms provided on said light receiving surface and having different apex angles, wherein at least one kind of prism in the plurality of kinds of prisms having different apex angles has a relation, $$\{P - 2h \times \tan(\alpha/2)\} \times \cos\{(\alpha/2) - \theta 2\} > 0.087 \text{ mm}$$

(but, $\theta 2 = \sin^{-1}[\{(\alpha/2) - (90° - \theta 2)\}/n]$)

where an apex angle of the prism is $\alpha$, a pitch of the prism is P, a height of the prism is h, a substantial maximum emitting angle of light emitted from the light source is $\theta_0$ and a refractive index of the light guiding plate is n.

* * * * *

UNITED STATES PATENT AND TRADEMARK OFFICE
CERTIFICATE OF CORRECTION

| | | |
|---|---|---|
| PATENT NO. | : 7,072,116 B2 | Page 1 of 1 |
| APPLICATION NO. | : 10/828552 | |
| DATED | : July 4, 2006 | |
| INVENTOR(S) | : Okuwaki et al. | |

It is certified that error appears in the above-identified patent and that said Letters Patent is hereby corrected as shown below:

Column 16, lines 4-6, the formula should read:

-- $\{ P-2h \times \tan(\alpha/2) \} \times \cos \{ (\alpha/2 - \theta 2 \} > 0.087$ mm (but, $\theta 2 = \sin^{-1} [ \{ (\alpha/2) - (90° - \theta 2) \} / n ])$. --

Signed and Sealed this

Twenty-seventh Day of March, 2007

JON W. DUDAS
*Director of the United States Patent and Trademark Office*